(12) United States Patent
Fox et al.

(10) Patent No.: US 10,448,252 B2
(45) Date of Patent: *Oct. 15, 2019

(54) APPARATUS AND METHOD FOR CONTROLLING ACCESS TO A TELECOMMUNICATIONS NETWORK

(71) Applicant: Vodafone IP Licensing Limited, Newbury, Berkshire (GB)

(72) Inventors: David A. Fox, Reading (GB); Timothy Frost, Madrid (ES); Gavin Wong, Surrey (GB); Jonathon Batkin, Wiltshire (GB); Jose-Luis Carrizo-Martinez, Newbury (GB)

(73) Assignee: Vodafone IP Licensing Limited, Newbury, Berkshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/440,512

(22) Filed: Feb. 23, 2017

(65) Prior Publication Data

US 2017/0257766 A1     Sep. 7, 2017

Related U.S. Application Data

(63) Continuation of application No. 14/226,958, filed on Mar. 27, 2014, now Pat. No. 9,585,017, which is a
(Continued)

(30) Foreign Application Priority Data

Nov. 22, 2006  (GB) .................................. 0623321.7
Jan. 30, 2007  (GB) .................................. 0701759.3
Sep. 18, 2007  (GB) .................................. 0718152.2

(51) Int. Cl.
*H04W 36/14* (2009.01)
*H04W 12/08* (2009.01)
(Continued)

(52) U.S. Cl.
CPC ........... *H04W 12/08* (2013.01); *H04W 36/14* (2013.01); *H04W 60/00* (2013.01); *H04W 68/04* (2013.01);
(Continued)

(58) Field of Classification Search
None
See application file for complete search history.

(56) References Cited

U.S. PATENT DOCUMENTS 6,295,450 B1 *   9/2001   Lyer ..................... H04W 36/26
                                                        455/417
7,613,444 B2    11/2009   Lindqvist et al.
(Continued)

FOREIGN PATENT DOCUMENTS

EP       0805609 A2    11/1997
EP       1 286 561 A1   2/2003
(Continued)

OTHER PUBLICATIONS

Chinese Search Report issued in Application No. 201410319224.9.

*Primary Examiner* — German Viana Di Prisco
(74) *Attorney, Agent, or Firm* — Workman Nydegger

(57) ABSTRACT

A GSM, UMTS or LTE mobile telecommunications network includes a radio access network comprising base stations, and further includes one or more additional access points. An access point may be connected to the network core by an IP transport broadband connection. The access point is configured to appear to the mobile terminal as a base station. Arrangements are disclosed which allow the network to restrict access to the network via these access points whilst also minimizing signaling requirements. The access points may be excluded from traditional Tracking Areas, but asso-
(Continued)

ciated therewith by a network controller in a mapping in order to notify authorized mobile terminals of the Access Point's existence.

20 Claims, 7 Drawing Sheets

Related U.S. Application Data continuation of application No. 12/312,699, filed as application No. PCT/GB2007/004471 on Nov. 22, 2007, now abandoned.

(51) Int. Cl.
*H04W 60/00* (2009.01)
*H04W 68/04* (2009.01)
H04W 48/02 (2009.01)
H04W 68/12 (2009.01)
H04W 84/04 (2009.01)
H04W 92/24 (2009.01)

(52) U.S. Cl.
CPC ............ *H04W 48/02* (2013.01); *H04W 68/12* (2013.01); *H04W 84/045* (2013.01); *H04W 92/24* (2013.01)

(56) References Cited

U.S. PATENT DOCUMENTS

| | | |
|---|---|---|
| 8,509,785 B2 | 8/2013 | Nylander et al. |
| 2002/0105927 A1* | 8/2002 | Holma ............... H04W 36/0061 370/331 |
| 2003/0040314 A1* | 2/2003 | Hogan .................. H04W 60/00 455/435.1 |
| 2004/0198319 A1 | 10/2004 | Whelan et al. |
| 2004/0204097 A1* | 10/2004 | Scheinert ............ H04M 1/2535 455/561 |
| 2005/0111409 A1 | 5/2005 | Spear et al. |
| 2006/0019669 A1 | 1/2006 | Moon et al. |
| 2007/0054668 A1* | 3/2007 | Scheinert ............. H04W 12/08 455/435.1 |
| 2007/0105568 A1 | 5/2007 | Nylander et al. |
| 2007/0153735 A1 | 7/2007 | Frederiksen et al. |
| 2007/0184824 A1 | 8/2007 | Nylander et al. |
| 2008/0051088 A1 | 2/2008 | Tariq et al. |
| 2010/0075698 A1* | 3/2010 | Rune ..................... H04W 68/08 455/458 |
| 2010/0151852 A1 | 6/2010 | Mori et al. |
| 2010/0228859 A1 | 9/2010 | Backstrom et al. |
| 2011/0177794 A1 | 7/2011 | Nylander et al. |
| 2012/0258750 A1* | 10/2012 | Kim ...................... H04W 48/20 455/509 |
| 2015/0024743 A1* | 1/2015 | Zheng .................. H04W 48/16 455/434 |

FOREIGN PATENT DOCUMENTS

| | | |
|---|---|---|
| EP | 1 475 986 A2 | 11/2004 |
| EP | 1519613 A2 | 3/2005 |
| EP | 1 551 198 A1 | 7/2005 |
| WO | WO 98/39940 | 9/1998 |
| WO | WO 00/54537 | 9/2000 |
| WO | WO 02/17671 A1 | 2/2002 |
| WO | 2005065214 A2 | 7/2005 |
| WO | WO 2005/079087 A1 | 8/2005 |
| WO | WO 2005/086421 A1 | 9/2005 |
| WO | WO 2006/031159 | 3/2006 |

* cited by examiner

APPARATUS AND METHOD FOR CONTROLLING ACCESS TO A TELECOMMUNICATIONS NETWORK

CROSS REFERENCE TO RELATED APPLICATIONS

This application is a continuation of U.S. application Ser. No. 14/226,958, filed Mar. 27, 2014, entitled "APPARATUS AND METHOD FOR CONTROLLING ACCESS TO A TELECOMMUNICATIONS NETWORK," which is a continuation of U.S. application Ser. No. 12/312,699 filed Feb. 16, 2011, which claims priority under 35 U.S.C. § 371 to PCT/GB2007/004471 entitled "TELECOMMUNICATIONS NETWORKS AND DEVICES," filed on Nov. 22, 2007, the disclosure of each application is hereby incorporated by reference in its entirety.

FIELD

The present invention relates to a telecommunications network including a radio access network for wirelessly transmitting between a mobile telecommunications device and a base station. The present invention also relates to a method and arrangement for controlling communication access of a mobile device to one or more base stations. The present invention further relates to a system and method for reducing paging in a mobile telecommunications network and in particular to a system and method for reducing the paging of a mobile terminal with the mobile is camped on an access point/femto-cell.

BACKGROUND

When a calling party (whether a subscriber within the mobile telecommunications network or outside it) attempts to call a mobile terminal within the network, that mobile terminal must be paged. Paging is a process of broadcasting a message which alerts a specific mobile terminal to take some action, such as to notify the terminal that there is an incoming call to be received.

The architecture and steps taken when an incoming call is directed to a mobile communication device across a GSM/UMTS macro network are shown in FIGS. 1 and 2.

1. At step 100, a call is initiated for a target mobile subscriber B. The call may have been initiated by another mobile or from a fixed line device. Typically, this call is initiated by entering the unique contact number (for example MSISDN) of subscriber B.
2. The carrier from where the call is initiated, or an interconnecting carrier, identifies a particular mobile operator that the contact number for subscriber B is assigned to (step 110). The carrier identifies a Gateway Mobile Switching Centre (GMSC) 210 associated with that mobile operator within the core network 12 and contacts that GMSC 210 (step 120). Gateway MSC 210 then takes on responsibility for routing the call to the target subscriber.
3. If the GMSC 210 does not know the subscriber, which is typically the case, it queries the Home Location Register (HLR) 10 associated with the mobile operator to which B is a subscriber to determine the Mobile Switching Centre (MSC), in this case MSC 2, which is currently handling incoming and outgoing communication for subscriber B and to which subscriber B is currently registered (step 130). HLR 10 stores the details of the MSCs which are currently handling communications for each of its subscribers.
4. At 140 GMSC 210 forwards the call to MSC 2 which is currently handling communications to and from target subscriber B. The control of the call is passed to the MSC.
5. At 150 the MSC identifies the target subscriber and determines from its Visitor Location Register (VLR) 14 in which Location Area (LA) subscriber B is located. A location area is a geographic area covered by at least one cell. A MSC covers at least one location area.
6. At 160, MSC 2 instructs the BSC(s) and/or RNC(s) parenting cells belonging to that LA to page the subscriber on all cells within the location area in which the subscriber is located.
7. Paging messages are then transmitted on the paging channels of all the cells of the LA in which the customer is located.
8. The target subscriber receives and reads the paging message and responds at 170, setting up a radio signalling channel and progressing with the call control.
9. The call is established at 180 and a radio voice channel is established.

Typically there are tens of MSCs in each country, each being responsible for several cells in at least one LA. Thus when an incoming call is directed to a mobile subscriber, only a fraction of the total number of cells in the network are paged (i.e. those in the relevant LA under control of the relevant MSC). In this way, pages for a particular subscriber are not transmitted in cells under MSCs which do not contain the subscriber.

There have recently been proposals to allow access to the features and services provided by GSM and UMTS networks other than by accessing those networks in the conventional manner described above. It has been proposed to increase network capacity by providing additional special base stations (micro base stations), variously referred to as access points (APs), home access points (HAPs) or femto-cells, amongst others. These APs are typically located at a subscriber's home. It has also been proposed to use APs in the Long Term Evolution (LTE) telecommunications network currently being developed, but not yet implemented. LTE is likely to be the next network implementation after 3G.

APs connect to the core network of a mobile communication network via IP networks. Typically, APs will be available to mobile subscribers to plug into their home DSL connection and network signals are carried to and from the AP via the IP network. The AP will, typically, provide mobile network coverage throughout the home, but will have a small coverage area. Thus subscribers will camp on their AP only when in their home.

An advantage of using an access point connected to the core network via an IP network is that existing broadband DSL connections can be used to link mobile terminals with the network core without using the capacity of the radio access network or transmission network of a mobile telecommunications network, or they are able to provide mobile network access where there is no conventional radio access network coverage. For example, UMTS coverage could be provided by an access point where there is no conventional UMTS coverage (perhaps only GSM coverage).

Since these access points are not conventional base stations, however, additional challenges arise. In particular, communications between the access point and the network are IP based communications, and may be, for example, transmitted via an ADSL backhaul connection to an IP network, such as the Internet. However, the capacity of such ADSL backhauls are limited, and not under the control of the telecommunications network provider, so there needs to be restrictions put in place on which user terminals (UEs) are able to access each AP in order to maintain an acceptable degree of service quality.

A problem that arises because of the need of such access restrictions is that UEs will be split into those which are authorised to access each AP and those which are not authorised to. Nevertheless all UEs would attempt to access an AP once it became available as a preferred base station.

For instance, considering a UE in a connected state, when an AP provides the UE with the best signal strength in a given region, the UE's current Node B/base station will attempt to hand the UE over to the AP. If the UE is one of the UEs which is not supposed to use the AP, the handover procedure will be initiated and the core network or the AP will have to reject the handover. Similarly, considering a UE in an idle state, when the UE receives the Location Area broadcast by the AP, and notes it to be different from its previous Location Area, the UE will look to camp on the AP and request a Location Area update from the network. If the UE is not authorized to camp on the AP the update will be rejected by the core network.

These access rejections are a waste of signalling resources. This is particularly a problem where an AP exists in an area of high traffic or high penetration of APs, as there is likely to be an unacceptable level of access attempts by UEs, many of which will result in unnecessary signalling. There therefore needs to be a better balance between restricting access to APs and limiting the use of signalling resources in doing so.

A further problem faced by mobile communication networks is how to handle paging through APs.

By definition, the location of mobiles on idle mode is only known with the resolution of the LA. When a mobile moves between LAs, i.e. when it reselects a cell belonging to a different LA to that where it is registered, it initiates a LA update procedure to inform the network about such a move.

Therefore, when a call has to be terminated towards a mobile in idle mode, the phone needs to be paged on all cells of the LA. The load of the paging channels in any given cell is proportional to the number of cells in the location area, so when numerous APs are added to the network, the network load naturally increases. However, if this load becomes too high, the LA would need to be split or cells re-parented into another LA.

Due to the limitations of the network and to the expectation that each RNC concentrator will control in the order of hundreds of thousands of APs, it is likely that a high number of APs may belong to the same LA. Mobile terminal traffic will therefore create a considerable paging load on the femto-layer.

These problems are addressed by the present invention.

SUMMARY

According to a first aspect, the present invention provides, in a telecommunications network including a radio access network comprising a plurality of base stations, each defining a cell, for wirelessly transmitting data that is receivable by one or more mobile terminals, wherein at least one of the base stations is an Access Point (AP), a method of controlling access to the telecommunications network via the at least one Access Point, the method including: defining tracking areas in the network covering one or more base station cells but excluding the at least one Access Point cells.

Preferably this method includes creating a mapping associating one of the at least one Access Points with one and more Tracking Areas, and using the mapping to perform at least one of the following:
a) notify an idle mobile terminal that it is authorised to select the one Access Point when in the one or more Tracking Areas;
b) trigger the establishment of a transport network connection between a base station and one of the at least one Access Points.
c) trigger the establishment of a transport network connection between an MME and one of the at least one Access Points.
d) page a mobile terminal where one of the one or more Tracking Areas was the last Tracking Area recorded for the mobile terminal;
e) notify an idle mobile terminal that it is authorised to move about the mapping without performing a Tracking Area update;
f) notify a mobile terminal that it should undertake a search for transmissions by the one Access Point;
g) notify a mobile terminal that it should undertake measurements of transmission received from the one Access Point;
h) notify a base station controlling handover of a mobile terminal that the mobile terminal is authorised to be handed over to the one Access Point.

In a second aspect, the present invention provides, in a telecommunications network including a radio access network comprising a plurality of base stations configured to wirelessly transmitting data that is receivable by one or more mobile terminals, wherein at least one of the base stations is an Access Point (AP), a method of restricting access to the at least one Access Point, the method including: transmitting information from each Access Point from which mobile terminals are able to determine their ability to access the given base station.

Preferably the information transmitted is an Access Indicator Field. It is also preferable that unless it is determined that the mobile terminal has a right of access to the base station, the mobile terminal does not attempt to access the base station.

The Access Indicator Field can be used by the mobile terminal to determine if it is authorised to use the Access Point without the need for the mobile terminal signalling an intent to use the AP and determining its authorisation status from the core network. This aspect of the invention therefore reduces the use of signalling resources.

According to a third aspect, the present invention provides a telecommunications network including a radio access network comprising a plurality of base stations, each defining a cell, and being configured to wirelessly transmit data that is receivable by one or more mobile terminals, with at least one of the base stations being an Access Point (AP); and wherein the radio access network is arranged in a plurality of tracking areas with each tracking areas covering one or more cells but excluding the cells of the at least one Access Point.

Preferably each Access Point is a base station connected by IP transport to the network.

According to a fourth aspect, the present invention provides a telecommunications network including a radio access network comprising a plurality of base stations configured to wirelessly transmit data that is receivable by one or more mobile terminals, with at least one of the base stations being an Access Point (AP), and wherein the least one Access Point is configured to broadcast information from which the at least one mobile terminal is able to determine if it has access rights to each of the at least one Access Points.

Preferably, according to this fourth aspect of the invention, the at least one Access Point is configured to broadcast an Access Indicator Field from which the one or more mobile terminal is able to determine if it has access rights.

For a better understanding of the present invention embodiments will now be described by way of example, with reference to the accompanying drawings, in which:

BRIEF DESCRIPTION OF THE DRAWINGS

In the drawings like elements are generally designated with the same reference sign.

DETAILED DESCRIPTION

Figure 3:
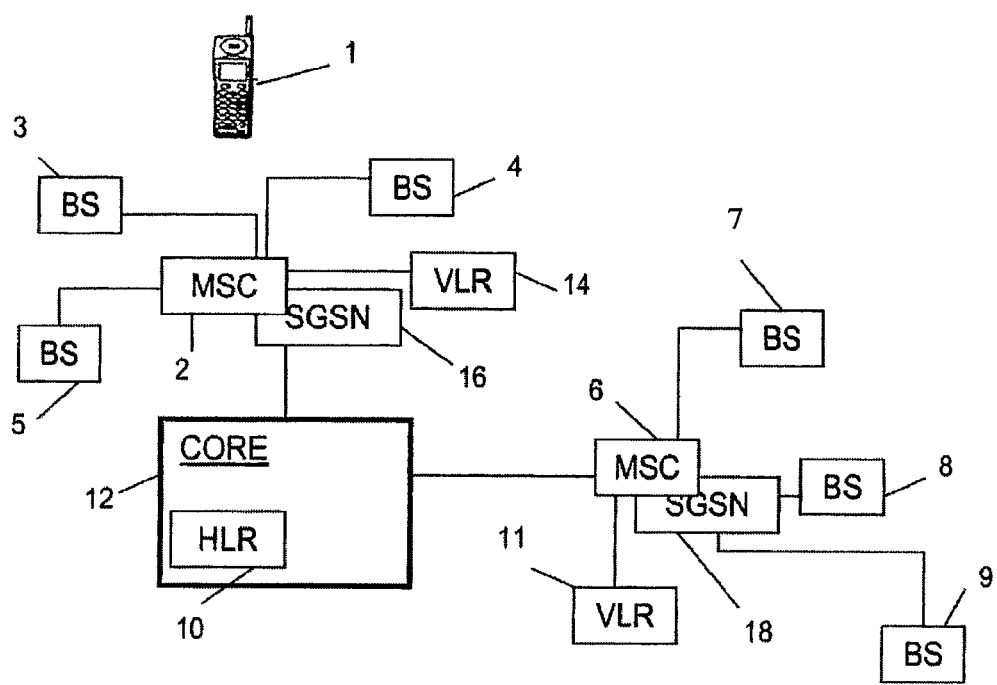
FIG. 3 is a diagrammatic drawing of key elements of a mobile telecommunications network for use in explaining the operation of such a network.

Key elements of a mobile telecommunications network, and its operation, will now briefly be described with reference to FIG. 3.

Each base station (BS) corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal (UE) is shown at 1. The mobile terminal may be any portable device with networking capabilities, such as a handheld mobile telephone, a personal digital assistance (PDA) or a laptop computer equipped with a datacard.

In a GSM mobile telecommunications network, each macro base station comprises a base transceiver station (BTS) and a base station controller (BSC). A BSC may control more than one BTS. The BTSs and BSCs comprise the radio access network.

In a UMTS mobile telecommunications network, each macro base station comprises a node B and a radio network controller (RNC). An RNC may control more than one node B. The node Bs and RNCs comprise the radio access network.

In the proposed LTE mobile telecommunications network, each macro base station comprises an eNode B. The macro base stations are arranged in groups and each group of macro base stations is controlled by one or more core network management entities, such as a Mobility Management Entity (MME) and possibly a User Plane Entity (UPE).

Figure 1:
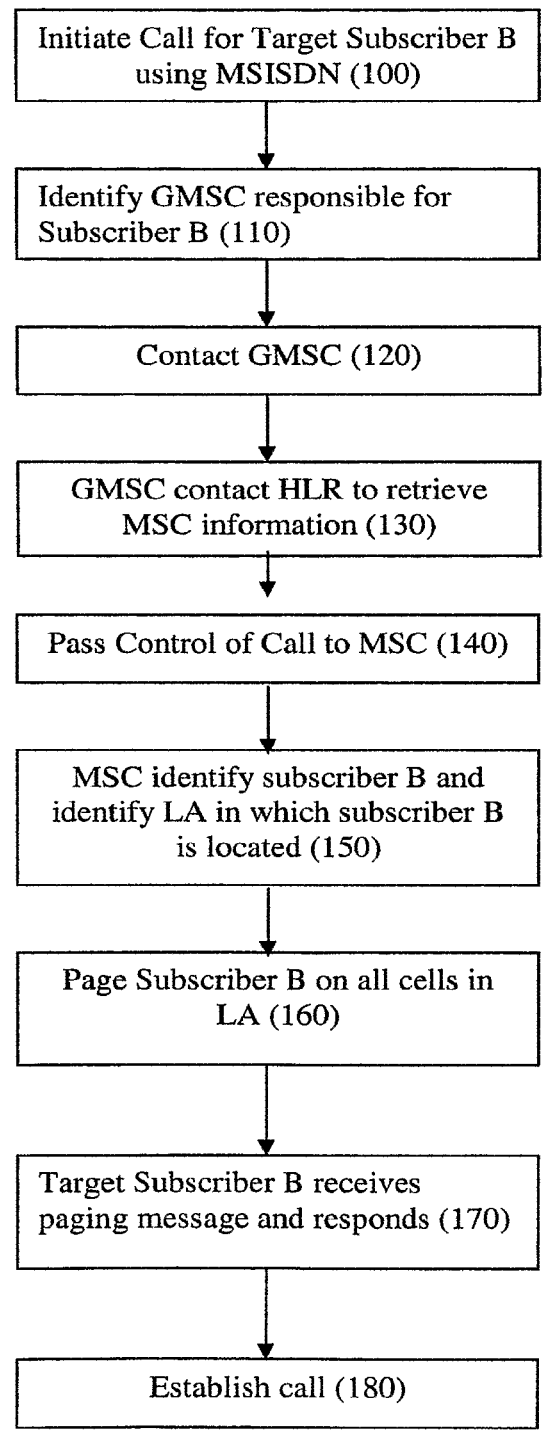
FIG. 1 is a flowchart showing the steps taken when an incoming call is direct to a mobile terminal across a macro network according to the prior art.

Conventionally, in a GSM/UMTS network, the base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1. The base stations 3, 4, 5, 7, 8 and 9 each have dedicated (not shared) connection to their MSC2 or MSC6—typically a cable connection. This prevents transmission speeds being reduced due to congestion caused by other traffic.

Each subscriber to the network is provided with a smart card or SIM which, when associated with the user's mobile terminal, identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR) 10 which, for each subscriber to the network, stores the IMSI and the corresponding MSISDN together with other subscriber data, such as the current or last known MSC or SGSN of the subscriber's mobile terminal.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 3 associated with the particular cell in which the terminal 1 is located. In a traditional network, the base station 3 then transmits this IMSI to the MSC 2 with which the BS 3 is registered. In a network using the functionality described in 3GPP TS 23.236, the base station follows prescribed rules to select which MSC to use, and then transmits this IMSI to the selected MSC.

MSC 2 then accesses the appropriate storage location in the HLR 10 present in the network core 12 and extracts the corresponding subscriber MSISDN and other subscriber data from the appropriate storage location, and stores it temporarily in a storage location in a visitor location register (VLR) 14. In this way, therefore the particular subscriber is effectively registered with a particular MSC (MSC 2), and the subscriber's information is temporarily stored in the VLR (VLR 14) associated with that MSC.

When the HLR 10 is interrogated by the MSC 2 in the manner described above, the HLR 10 additionally performs an authentication procedure for the mobile terminal 1. The HLR 10 transmits authentication data to the MSC 2 in "challenge" and "response" forms. Using this data, MSC 2 passes a "challenge" to the mobile terminal 1 through base station 3. Upon receipt of this data, the mobile terminal 1 passes this data to its SIM and produces a "response". This response is generated using an encryption algorithm on the SIM and a unique Ki on the SIM. The response is transmitted back to the MSC 2 which checks it against its own information for the subscriber which checks it against information that it has obtained for that subscriber from the HLR 10 in order to complete the authentication process. if the response from the mobile terminal 1 is as expected, the mobile terminal 1 is deemed authenticated. At this point the MSC 2 requests subscription data from the HLR 10. The HLR 10 then passes the subscription data to the VLR 14.

The authentication process will typically be repeated at regular intervals while the mobile terminal 1 remains activated and can also be repeated each time the mobile terminal makes or receives a call, if required.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the base station 3 and passed on to MSC 2. MSC 2 routes the call towards the called party. By means of the information held in the VLR 14, MSC 2 can associate the call with a particular subscriber and thus record information for charging purposes.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLR for the packet switched domain.

Figure 2:
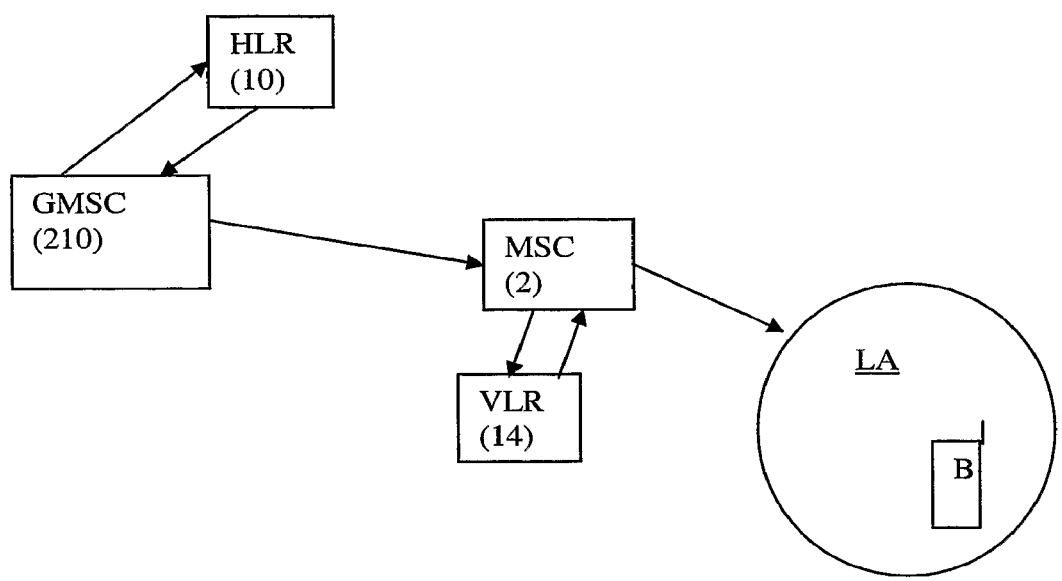
FIG. 2 is a simplified macro network useful in explaining the operation of the flowchart of FIG. 1.

A known paging process in a UMTS/GSM network was describe in relation to FIGS. 1 and 2. If the network knows in which cell the mobile terminal is located, it is only necessary to page in that cell. However, if the mobile terminal is moving within the network, the precise cell in which the mobile terminal is located may not be known. It will therefore be necessary to perform paging in a number of cells. The greater the number of cells in which paging must occur, the greater the waste of valuable signalling capacity within the network.

In a UMTS/GSM network, the problems of excessive use of signalling capacity is addressed in a known manner by dividing the coverage area of the mobile telecommunications network into a plurality of location areas (LAs) and into a plurality of routing areas (RAs). The equivalent areas in the proposed LTE network are described as tracking areas (TAs).

A location area in a UMTS/GSM network relates to a particular geographical area for communications in the circuit-switched domain. Typically, although not necessarily, a location area is larger than the area of a single cell but is smaller than the area covered by one MSC. Each cell within the network broadcasts data indicative of the identity of its location area. The mobile terminal uses this data to determine when it has moved into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location update. If the MSCNLR is the same for the new and old location areas, the network can immediately authenticate the mobile terminal and note the change of location area. However, if the mobile terminal is moved to a different MSCNLR, the MSCNLR addresses a message to the HLR. The HLR notes the new location and downloads security parameters to allow the network to authenticate the mobile. It also passes on subscription details of the user to the new VLR and informs the old VLR to delete its records.

A routing area in a UMTS/GSM network relates to a particular geographical area for communications in the packet-switched domain. Typically, although not necessarily, a routing area is larger than the area of a single cell but is smaller than the area covered by one SGSN. A routing area is typically, although not necessarily, smaller than a location area. There may be many routing areas within one location area. Bach cell within the network broadcasts data indicative of its routing area (in addition to the data mentioned above indicative of the identity of its location area). The mobile terminal uses this received data to determine when it has moved to a new routing area. The terminal stores the last known routing area on its SIM. The information stored on the SIM is compared with the routing area information broadcast by the local cell. The identities of the two routing areas are compared. If they are different, the mobile terminal determines that it has entered a new routing area. The mobile terminal then gains access to a radio channel and requests a routing area update.

The functionality just described may also apply to the proposed LTE mobile telecommunications network, with its eNode Bs performing the functionality of the base stations and the MME/UPE performing the functionality of the MSCsNLRs. It is also to be appreciated that the functionality just described is one example of a network in which the embodiments of the invention may be implemented.

The expression "Tracking Area" will be used as a general term to encompass LAs and RAs in a GSM/UMTS network, as well as the corresponding areas in an LTE network.

Figure 4:
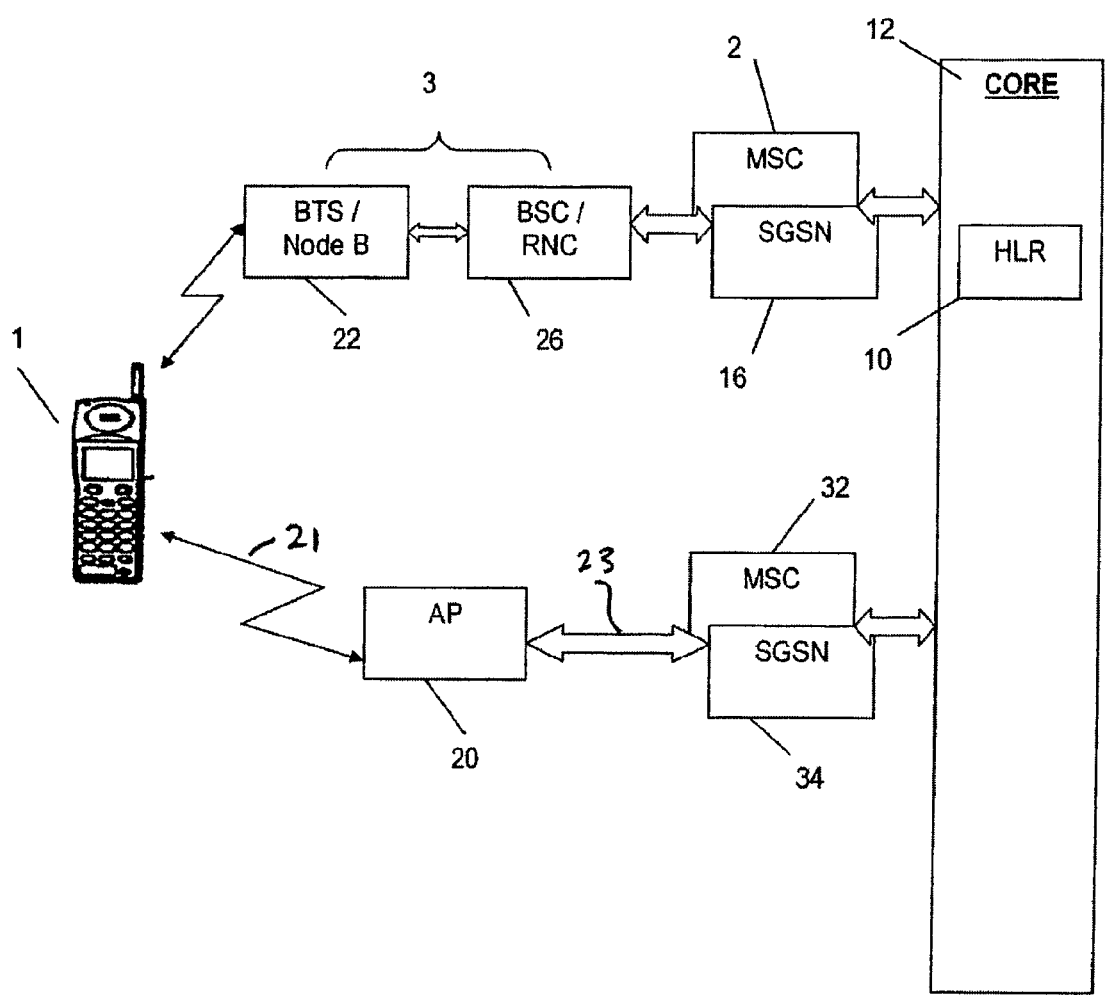
FIG. 4 shows a modified mobile telecommunications network for receiving IP based communications from an access point in addition to communications from a conventional base station.

FIG. 4 shows elements for providing access to a GSM or UMTS network by both a conventional macro base station 3 and a micro base station (AP 20). The Access Point, AP 20 provides a radio link 21 to mobile terminal 1.

The radio link 21 from the AP 20 to the mobile terminal 1 uses the same cellular telecommunication transport protocols as the conventional base station 3 but with a smaller range—for example 25 m. The AP 20 appears to the mobile terminal 1 as a conventional base station, and, on a general level, no modification to the mobile terminal 1 is required in order for it to operate with the AP 20. The AP 20 performs a role corresponding to that of a GSM BTS 22 and BSC 26 and/or UMTS Node B and RNC and/or an LTE Node B.

Communications between the access point 20 and the core network 12 are IP based communications, and may be, for example, transmitted over a broadband IP network (and routed via the Internet). The communications are routed via MSC 32 or SGSN 34. The access point 20 converts the cellular telecommunications transport protocols used between the mobile terminal 1 and the AP 20 to IP based signalling.

The connection 23 between the access point 20 and the core network 12 may use the PSTN telephone network. Typically a DSL cable connection connects the access point 20 to the PSTN network. The data is transmitted between the access point 20 and the core network 12 by IP transport/DSL transport (a backhaul connection). The bandwidth of the cable connection between the access point and the telephone exchange is shared with multiple other users (typically between 20 and 50 other users). This means that the speed of transmission of data between the access point 20 and the telephone exchange varies significantly in dependence upon the activities of the other access point devices sharing the connection.

The access point 20 may be connected to the core network 12 by means other than a DSL cable and the PSTN network. For example, the access point 20 may be connected to the core network 12 by a dedicated cable connection that is independent of the PSTN, or by a satellite connection between the access point 20 and the network core 12.

A conventional macro base station is connected by an exclusive, dedicated connection to the MSC 2/SGSN 16/MME (not shown) and network core 12. The connection is not shared with other base stations, and therefore its speed will not depend upon other traffic of other devices.

AP 20 would typically be configured to serve a Wireless Local Area Network (WLAN) located in a home or office, in addition to GSM/UMTS/LTE networks. The WLAN could belong to the subscriber of the mobile terminal 1, or be an independently operated WLAN. The owner of AP 20 can prescribe whether the AP is either open or closed, whereby an open AP is able to carry communications from any mobile device in the GSM/UMTS/LTE network, and a closed AP is only able to carry communications from specific pre-designated mobile devices.

With this background in mind, an implementation of the first embodiment of the invention will now be described, which seeks to minimise unnecessary signalling in regard to closed APs.

Conventionally, when a mobile terminal is in idle mode and moves from a first location area to a second location area, the mobile terminal detects that a different Location Area identity (LA ID) (from that stored in the mobile terminal) is being broadcast by the local base station/AP. The mobile terminal then sends a location area update request to the core network 12/MME. The request includes the first (current) LA ID and the mobile 1 terminal's current Temporary Mobile Subscriber Identity (TMSI). The MSC/MME with which the mobile terminal is currently registered then sends a new TMSI to the mobile terminal 1. When the mobile terminal moves from a first (current) location area to a second location area, and the second location area is administered by a different MSC/MME, similar steps occur and in addition the different MSC/MME requests user profile information from the original MSC/MME.

Each cell provided by the core network has a unique cell global identity (COI), whereby the COI is typically a concatenation of the Location Area ID and a Cell ID and uniquely identifies a given cell. Traditionally, each AP has its own cell and also has its own unique Tracking Area identifier, which is broadcast (along with its cell ID), so that all passing mobile terminals are able to identify the AP and to attempt to access the network via the AP when proximate to it. In other words, the APs are traditionally treated the same as the Node Bs.

For instance, in idle mode, the UEs traditionally monitor the system information broadcast by the APs and the eNode Bs, so that the UEs are able to assess the network conditions and be ready to access the network by the most appropriate route. UEs are often described as "camping" on an AP or Node B when that AP or Node B provides the most suitable prospective access point.

In idle mode, the UE may be stationary, or be moving throughout the network. In whatever location the UE is, the UE will be able to receive system information broadcast from Node Bs and APs that are in range.

According to this first embodiment of the invention, APs are configured to broadcast an indication in the downlink from which each UE is able to determine if they have the right to access the network via the AP or not. According to this first embodiment of the invention, the information which the APs broadcast includes an Access Indicator Field, which is broadcast in addition to the AP's cell ID and TA ID. Other information, such as a Neighbouring Cell List may also be broadcast.

This Access Indicator Field serves to prevent the UEs from treating the AP in the same manner as an eNode B. In this regard the UEs are configured, upon receiving the Access Indicator Field, to determine if they are authorised to access the network via the AP before attempting to do so.

Considering a UE in idle mode detecting the signal broadcast by the AP, the UE will note the different Tracking Area from its previously recorded position. Rather than immediately requesting a TA area update, however, the UE will note the Access Indicator Field and determine from this field and the CGI field if it is authorised by the network to access the network via this AP.

For example, the Access Indicator Field may be a simple password which the UE needs to match with a pre-stored password to determine if access to the network via the AP has previously been granted.

Alternatively, from the Access Indicator Field, the UE may simply be notified that the transmitting Base Station is a micro-base station or AP. It may then use the broadcast information to determine if it is authorised to utilise the AP, such as by using the CGI field. In this regard, the UE could compare the CGI field or a component of the CGI field, such as its Cell ID component, to a list relating to any APs that the UE is authorised to access. This Access list may be stored on the UE itself, or remotely so that the UE queries a remote network entity to determine if it is authorised to use the AP.

Where the Access list is stored on the network, subscribers are mapped to appropriate APs, typically by storing each subscriber's MSISDN with an appropriate identifier of all APs with which it is registered (such as the AP ID).

In addition, the Access Indicator Field may include a decryption key that the UE uses to decrypt an access password previously stored on the UE, to determine if the user has previously been authorised to use this AP, or it may be an encrypted password code which the UE needs to use its own previously stored decryption key to decode.

If the UE determines that it is not authorised to use this AP, the UE will simply treat the AP as a cell from a forbidden TA (i.e. it will not perform future measurements of the AP) and maintain its existing Tracking Area record. If it is authorised, however, then the UE may request a TA update from the core network/MME. Therefore it is apparent that the broadcast Access Indicator Field can be used by the UE to determine if it is authorised to use the AP without the need for the UE signalling an intent to use the AP and determining its authorisation status from the core network/MME.

When a UE is authorised to camp on an AP, and a TA update is performed, an entity managing the UE, such as the GMSC/MME may also create a mapping between the AP and the UE's last recorded Cell's Tracking Area and provide a copy of this mapping to the UE. This mapping associates the AP with the TA, and effectively indicates that the UE's present AP is in or adjacent the TA of its last recorded cell, and can then be used by the UE to restrict the number of TA updates that it performs, by not requiring a TA update to occur when the UE moves between the AP and the UE's last recorded TA. This mapping is recognition of the fact that the range of the AP is typically small, so the likelihood of the UE moving out of the range of the UE and back into the range of the previously recorded Cell is high. The mapping can therefore be used to further minimise signalling between the UE and the MME.

This Tracking Area mapping may be stored alongside the AP Access list, on the UE itself and/or within the network. That is, in addition to the AP access list associating a UE/subscriber ID with an AP ID, the list can associate each AP ID with one or more TAs. This Access list would typically be updated whenever the network receives new AP authorisation data or tracking information, as applicable.

According to a second embodiment of the invention, APs are excluded from the predefined location areas/tracking areas (LAs/TAs) configured by the operator. By excluding the APs from the TAs it is possible to control a UE's ability to access the APs. The Tracking Areas are hence restricted to base stations in the macro-layer.

Therefore according to this second embodiment of the invention, the APs are not given a LA ID/TA ID or their LA ID/TA ID is set to "null". Each AP in this embodiment only broadcasts its Cell ID, and not a unique LNTA ID. Since the APs only have a unique cell global identity, the UEs do not consider them to be accessible merely by virtue of the information broadcast. Therefore, by virtue of not broadcasting a TA ID, the UEs will not consider the AP as a possible point of access; further information needs to be acquired by the UE before the AP will be considered a possible point of access. In other words, since there is no unique LNTA ID information, the UE will initially treat the AP as if it belonged to a Forbidden LNTA.

Figure 5:
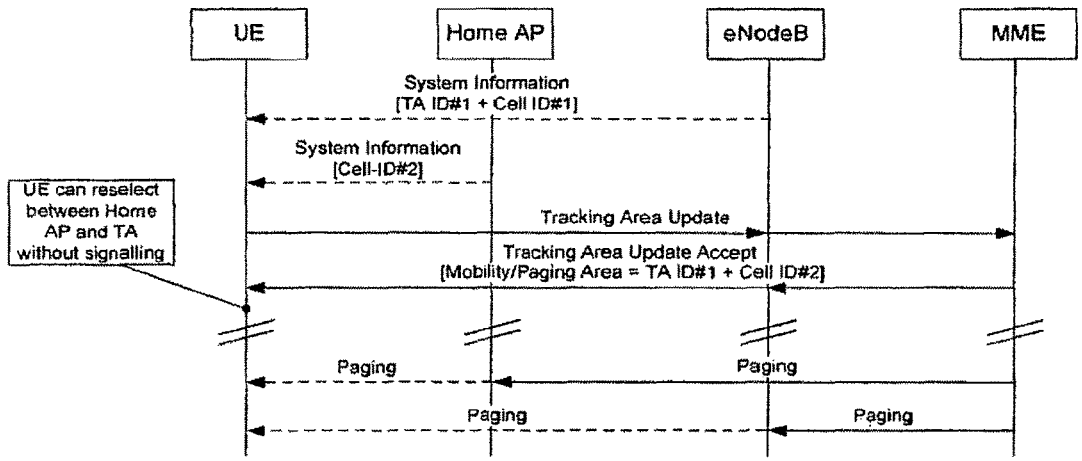
FIG. 5 shows an exemplary signalling diagram in relation to an UE in an idle state moving into the tracking area of a new base station.

An example of the signalling that may occur in the idle state situation for this second embodiment of the invention is illustrated in FIG. 5 in relation to the UE moving into the TA of a new base station/eNode B of a telecommunications network. This Figure illustrates how the UE is made aware of the AP if it is a possible point of access to the network.

The eNode B broadcasts system information which includes the eNode B's Cell ID and Location Area/Tracking Area ID, as well as possibly a "Neighbour Cell List" in the system information. The UE uses the broadcasted system information to know which cells to monitor, such as by keeping a record of signal strength and/or interference parameters. This system information only includes information about neighbouring eNode B's and perhaps nearby open APs; nearby closed APs are excluded. It is however preferable that all nearby APs are excluded, due to their more limited capacity, so the rest of this embodiment will be described with this presumption.

The UE will know that it has moved to a new TA, as the TA broadcast by the eNode B will be different to its last recorded eNode B. The UE will therefore perform a Mobility Management (MM) Procedure, such as a location area/tracking area update, so that the network knows the new location of the UE, for future paging requirements. With reference to FIG. 5, to perform the Tracking Area Update, the UE transmits a "Tracking Area Update" request message to the eNode B to which it has moved.

Once received, the eNode B forwards the "Tracking Area Update" message to a core network component, such as the MME. The MME stores a record of the new TA, and also refers to a list of APs accessible to the UE from the new location (if any). In this regard the MME preferably has a list of all APs accessible in each of its location areas/tracking areas, and all UEs that are authorised to access each of those APs. The MME will create a mapping between the new Tracking Area of the UE and the accessible APs associated with that TA, and include the mapping in the UE context. The UE context will be stored at the MME and a copy forwarded to the eNode B in the "Tracking Area Accept" update message. The mapping is stored at the MME for future use, and can be updated as new information is received. For instance, the stored UE context can be used during handover to selectively download information to the new eNode B/AP for use m subsequent handovers.

In the FIG. 5 example, the UE is allowed to access the Home AP, and so the MME will map an association between the Home AP and the UE's current macro-layer TA. Therefore, when the MME transmits the "Tracking Area Accept" update message back to the UE, via the eNode B, this message includes the UE context, as well as the Cell ID of the Home AP, being Cell ID#2, and the associated macro-layer Tracking Area, being TA ID#1. The inclusion of the AP's cell ID in this message is used to inform the UE that an AP cell is available and that it should look for that AP in addition to the cells controlled by neighbouring eNode Bs identified in the system information. This therefore induces the UE to do a search for the AP in order to detect its broadcast signal.

Therefore, in this way the network notifies the UE as to which APs it is able to access. By doing so, the typical "trial and error" signalling approach is avoided, as the UEs will not try to access an AP until they have been notified that they can access the AP. A further advantage of excluding the APs from the Tracking Areas, is that more efficient searching can be achieved, as the UEs do not consider APs as possible points of access until told by the network.

When the UE is notified of the existence of an AP, and that it is an AP that the UE is allowed to access, the UE adds the Home AP to its list of entities on which it keeps a measurement report. The UE also utilises the mapping between the Home AP and the Tracking Area of the Node B to restrict the number of TA updates that it performs, by not requiring a TA update to occur when the UE reselects between the Home AP and the last recorded Cell's Tracking Area. This mapping is recognition of the fact that the range of the AP is typically small, so the likelihood of the UE moving out of the range of the UE and back into the range of the previously recorded Cell is large. The mapping can therefore be used to further minimise signalling between the UE and the MME.

In an alternative, it is to be appreciated that the UE may have access to a list of APs that it is allowed to use, so that the UE is notified by the core network of all APs in the UE's vicinity, and it is the responsibility of the UE to determine its eligibility to access each AP, such as was illustrated in the first embodiment of the invention. This list may be stored on the UE itself, or be remotely available to the UE, such as securely located on a remote server. It is, however, preferred that the information on accessible APs comes from the network, rather than the UE determining this itself, as this ensures signalling is kept to a minimum.

Where the core network performs the access determination, the UE will still typically have a list relating to the accessible APs, although this list will essentially be used for keeping a record of access passwords and the like.

The mapping between the Home AP and the Tracking Area of the eNode B has an additional advantage from the MME's perspective. In this regard, if a communication arrives for the UE, the MME will send a paging message in both the last recorded Tracking Area for the UE, being TA ID#1, and to any APs mapped to that Tracking Area, which in this case will be the Home AP (as referenced in FIG. 5). This allows the MME to trace the UE if it has camped on the AP, despite the AP being not part of a Tracking Area. The mapping therefore effectively creates a new Tracking Area, encompassing nearby APs which are accessible by the UE, which is unique to the UE.

Therefore, in general, when the UE, in idle mode, moves to a geographical location where the UE could reselect to the Home AP, the MME is responsible for ensuring that the necessary association between the new geographic location and the Home AP exists.

In a further variation, the size of the Macro-layer Tracking Area may be varied by the MME, depending upon the number of APs which the UE is allowed to access in that area. For instance, if the number of accessible APs mapped to a given Tracking Area is large, then the core network may decide to split that Tracking Area into two or more sections, or move some of the macro base stations within that Tracking Area to an alternative Tracking Area.

In a related variation, the physical size of a Tracking Area is typically decreased in urban areas in order to maintain a similar level of paging load to less-populated areas, as the concentration of UEs in urban areas is dramatically increased. One problem that arises from smaller Tracking Areas, however, is that for fast moving UEs, a higher signalling load on the core network results. Therefore, alternatively, or in addition, Tracking Areas for a UE can be determined based upon its speed, so that the faster the UE is travelling, the larger the physical Tracking Area allocated to the UE. In an implementation of this, eNode Bs will broadcast a number of different sizes of Tracking Areas, such as a smaller one for low mobility UEs and a larger one for higher mobility UEs.

For instance, a first Tracking area could be defined for use by terminals that are stationary or travelling at a speed up to and including a threshold speed, say of 20 kmh. A second Tracking Area could also be defined for use by terminals that are travelling at a speed greater than this threshold speed.

The speed of the terminal could be determined and communicated to the terminal by any appropriate means. For instance, the core network could determine the terminal's speed and notify it of such, such as via an OTA communication, so that the terminal could then determine the applicable Tracking Area. Alternatively, the terminal itself may be installed with a suitable application for determining its speed.

In a still further variation, which is particularly applicable in the situation of a UE being permanently associated with a Home AP, rather than the core network notifying the UE of the mapping between the Home AP and a proximate Tracking Area, in the interests of efficiency, this information may be provisioned to the UE by utilising an Over-The-Air (OTA) upload to the UE's SIM.

So far, this description of the embodiments of the invention, with the UE operating in Idle mode, has assumed that the UE is only associated with a single Tracking Area at any one time. However it is possible that the UE is associated with more than one Tracking Area. In this implementation, the identifiers of multiple Tracking Areas are broadcast in the system information of a cell. When the UE performs a Mobility Management (MM) procedure, such as a Tracking Area Update, the UE may become associated with more than one TA within which the idle mode UE is free to move within without contacting the network. When the UE is allocated multiple Tracking Areas. the MME needs to maintain a list of which TA IDs have been allocated to the UE. This is because, when it becomes necessary for the MME to page the UE, the MME would look up which eNode Bs form part of the Tracking Areas allocated to the UE in order to page them. The paging message would be passed to all the applicable eNode Bs in order to locate the UE.

Once the UE is in a connected state, the mobility of the UE is managed by the network, and so there are different considerations in regard to how the APs with no allocated Tracking Area ID, are managed. In this regard, in a connected state, the UE will be connected to the network via an eNode B or AP which provides the best signal. When the signal falls below a certain threshold, the UE will handover its connection to an alternative eNode B or AP.

Figure 6:
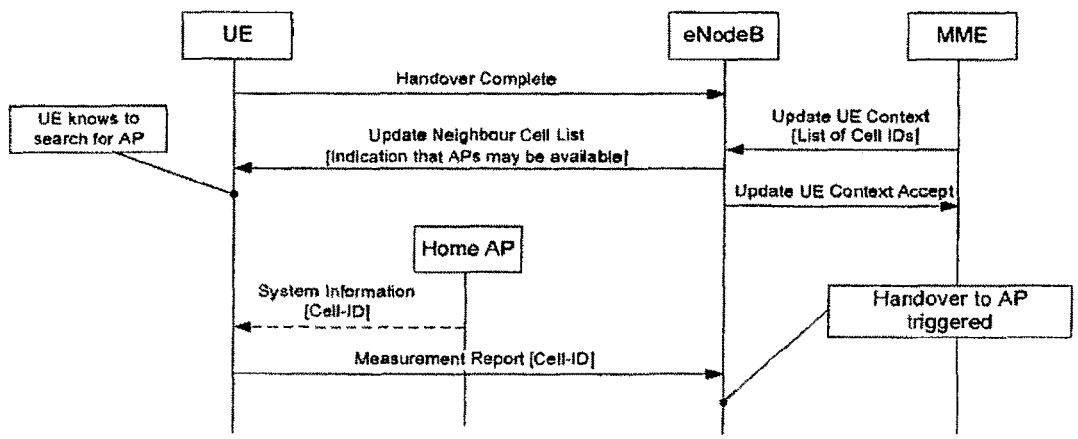
FIG. 6 shows an exemplary signalling diagram in relation to a UE in an active state moving into the tracking area of a new base station.

With reference to FIG. 6, the eNode B provides the UE with the best signal in this instance, and so has been handed over to it. Upon handover, the MME provides the eNode B with a "UE context", which contains information about the UE and neighbouring cells.

Since APs are not included in the Tracking Area associated with the eNode B, this UE context also contains information about any nearby APs that the UE is allowed to be connected to, which in this instance is only the Home AP.

The eNode B will provide the UE with an updated Neighbour Cell List, which includes the identities of any accessible APs, being the Home AP in this example. The UE can then provide a measurement report to the eNode B about the Home AP when it is discovered. During its idle time slots, a connected UE scans the Broadcast Control Channel (BCCH) of all the cells in its unique neighbouring cell list.

This neighbour cell list can be used to filter the UE's measurement reports—in that it only keeps reports on entities included in this cell list. These measurement reports are provided to the eNode B, as when the UE is in a connected state, it is the job of the eNode B to monitor the measurement reports and decide when handover is necessary.

It is to be appreciated that the identity details of all the accessible APs is preferably only provided to the UE when the amount of APs that the UE can access is small. If however, there are a large number of APs to which the UE can connect to, then a filtering mechanism is preferably used, whereby the MME, for instance, filters which AP details will be downloaded to the UE. One approach for doing this is to build a table of Tracking Areas/eNode Bs for each AP location, which is used to control from which cells it is possible to perform a handover to the AP. This table could also be used to provide the UE with information as to which subset of APs for which it should be scanning the network. This would therefore minimise wastage of the UE's battery, as less scanning would be required.

This list may also be used by the eNodeB to trigger the establishment of the X2 interface between the eNodeB and the AP. The X2 interface is the transport network connection between eNode Bs. It is also used for APs to communicate with eNode Bs. As APs are added to the network, the relationship between these APs and their neighbouring base stations needs to be established, and the table is a mechanism for notifying the eNode B of the existence of the AP, and enables the X2 interface to be established between the two of them, if it has not already been done.

Since the eNode B is responsible for initiating handover when the UE is an active state, the eNode B uses the AP information stored in the UE context to ensure that the UE is only handed over to an AP where the network has approved the association. In other words, the UE can only be handed over to APs that are listed in this "UE context".

The eNode B will trigger a handover when its broadcast system information signal, as received by the UE, falls below a predetermined quality received threshold, and where a better quality signal is available from a neighbouring base station/AP.

The base stations/Node Bs therefore rely on the MME to provide them with information on the APs that the UE can utilise, since the APs are not included in the Tracking Areas in this embodiment of the invention. The MME accordingly needs to have up-to-date subscription information on the authorised APs for each UE.

Therefore, it is to be appreciated that in order for a UE to be able to access one or more APs, the UE's subscription information must provide the necessary authorisation. This can be done in non-real time using written subscription information provided when the Access Point is registered (i.e. a Home AP is registered, and the occupants of that home list their mobile terminals as being authorised to access the telecommunications network via that AP).

Alternatively, this could be achieved by a UE owner purchasing the right to gain access, such through a web application or by SMS. Once this purchase is completed, the MME is notified of such, and so updates its relevant list, and the UE also stores a record of the relevant AP's details, including, for example, as access password.

Alternatively, the owner of an AP may wish to reserve access to their AP for exclusive use of friends (e.g. for a home-located AP) or customers (e.g. for a business-located AP). A real-time registration process is preferable for this approach. The registration can be achieved by the AP "registered owner" inviting a person to use the AP by sending a specially formulated SMS to the network, such as "Grant Access to [telephone number]". Upon receiving this request, the MME would proceed to add the person's UE identity to its list of UE's authorised to access the particular AP.

In a further alternative, the registered owner of an AP has an access password that they are able to provide to a person to allow them to use their UE to access the AP. To effect this, the UE owner would enter the password into a third party's UE, and the UE would transmit a "Tracking Area Update" request message to the network, together with a field identifying the AP, and the AP password. This would force a Tracking Area Update in relation to the AP. The MME, upon receiving the Tracking Area Update request (via the nearest Node B) would note the inclusion of the AP and its password, verify the password and update its AP table to include the UE as an authorised user of the AP. The MME would also preferably create a mapping between the Tracking Area of the Node B that forwarded the TA update, and the AP. The UE would then be able to utilise the AP to access. the network.

The mapping of APs to tracking areas is an important component of these embodiments of the invention. It is to be appreciated that since an AP can be located in every house in a certain region, and that new APs can be added to the network at any time, the network needs to keep updating its associations between tracking areas and APs to ensure that best use of APs can be made by those UEs authorised to use them. In particular, transport network connections need to be established between the new APs and other Node Bs (the X2 interface) as well as between the new APs and the controlling MME (the S1 interface). The mappings can be used to establish these connections.

The X2 interfaces can be established by the eNode Bs, when they are passed the mapping information from the MME. This typically occurs when the UE is in active mode, and the eNode B's are responsible for controlling the mobility of the UE.

An S1 interface will need to be established to make an MME a controlling MME in the situation of a Home AP being newly added to the network. This AP will have one or more different Tracking Areas that overlap it, or which are adjacent to it. The network will therefore need to create mappings for each of the different Tracking Areas and the AP, so that an authorised UE in any of the different Tracking Areas is notified of the existence of the Home AP.

In other words, considering the authorised UE in idle mode moving into TA#1, which is adjacent to the AP, when the UE performs a Tracking Area Update, the UE will be informed of the existence of the Home AP, and the MME will create a mapping between TA#1 and the AP. The MME will also create the S1 interface between itself and the AP, if one has not already been created.

Should the UE then move into another Tracking Area, such as TA#2, then the AP will again perform a Tracking Area Update and also create a mapping between TA#2 and the AP in view of their geographical proximity. At this point, the MME may also create a mapping or link between TA#1, TA#2 and the AP, so that the UE is free to move in the area covered by both Tracking Areas and the AP without the need for a Tracking Area update. Once the process has been performed for each TA, it need not be repeated, as the MME will save the mappings for future reference.

If an access point is physically moved (e.g. when someone moves home), it will be necessary to cancel the mappings recorded for the AP, and to register the new location in the network, by updating the mapping between the AP location and the terrestrial cells/tracking areas.

A further embodiment of the invention will now be described, which also seeks to minimise unnecessary signalling in closed APs. In this embodiment, paging is sought to be minimised when the core network pages the UE, which is labelled Subscriber C in FIG. 7. In this embodiment, each AP is assigned to a location area which is handled by an MSC and paging and calls are routed to the APs via the core network. For a target subscriber C who is camped on AP 370, the initial steps of call and paging routing are the same as those followed when a subscriber is camped on a macro base station as discussed with reference to FIGS. 1 and 2.

Figure 8:
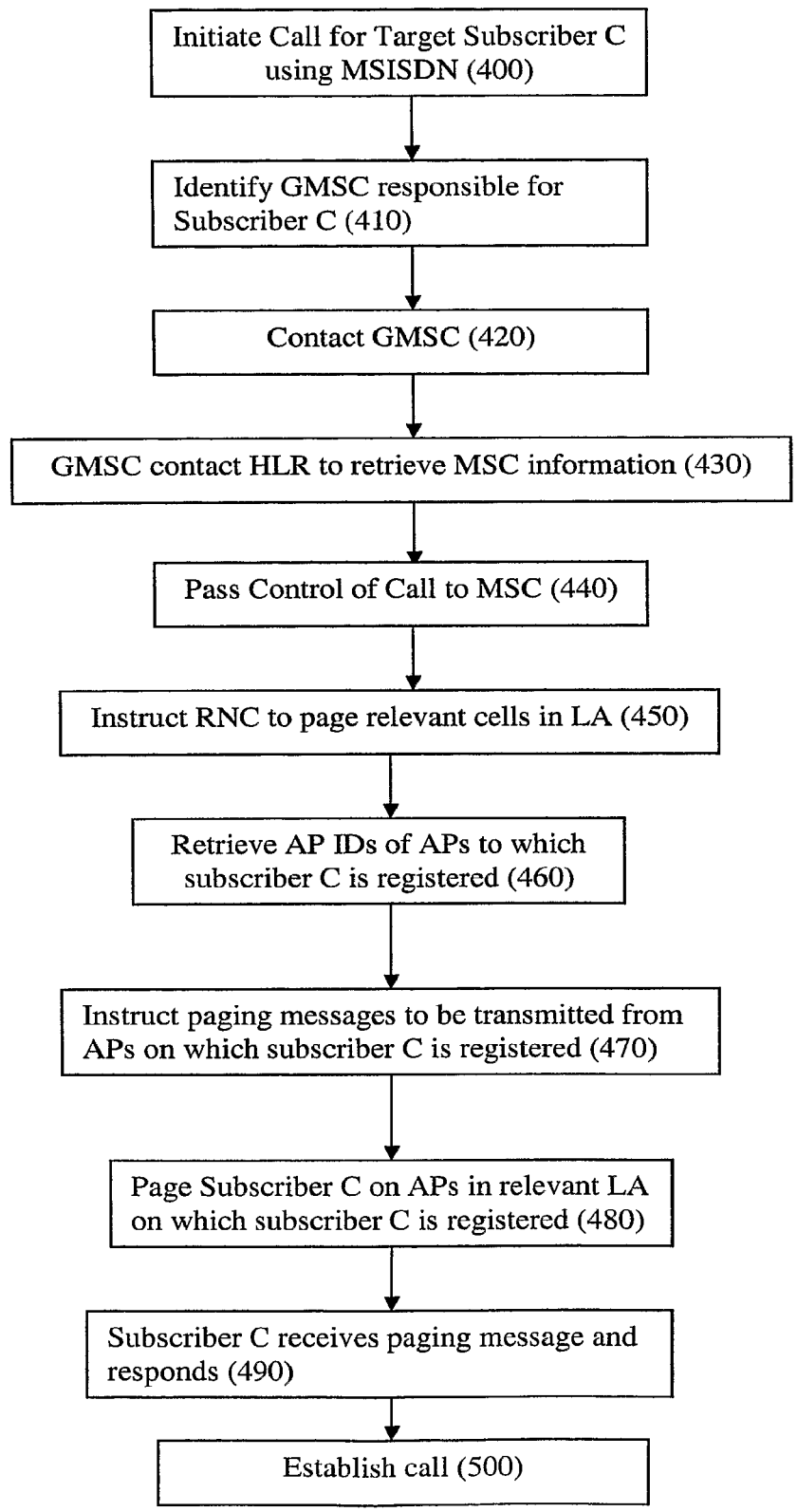
FIG. 8 illustrates a flowchart setting out the steps taken during the paging process for a subscriber camped on an AP according to an embodiment of the invention.

Specifically, with reference to the flowchart in FIG. 8, the GMSC/MME 310 responsible for the target subscriber is identified (step 410), and the call is routed to the GMSC 310 of the subscriber (step 420). The GMSC 310 then contacts HLR 320 to identify the MSC/eNode B which is currently responsible for subscriber C (step 420). The GMSC 310 passes control of the call to the MSC/eNode B (step 440).

On receiving control of the call, MSC 330 identifies the last cell/location area in which subscriber C was located. If the subscriber C is camped on an AP the MSC will identify the LA associated with that AP. Where a mapping exists associating an AP with one or more location areas, about which the terminal can move without without performing a location area update, it will be necessary to page the terminal in:
   any macro-network cells of those one or more location areas;
   the AP the terminal was last camped on;
   as well as any other APs in those one or more location areas that the terminal is authorised to use.

For any macro-network cells in that LA, the process continues as described in FIGS. 1 and 2 in relation to the macro layer for those macro cells.

At step 450, the MSC 330 passes the paging instruction to an RNC concentrator(s) 340 parenting the AP belonging to the relevant location area to page the subscriber C on the cells within the location area.

To determine if any other APs in the one or more LAs exist which the terminal is authorised to access, the network will hold an access list 360 in an Access Point Database 350 which maps subscribers to APs. Typically, each subscriber's MSISDN will be stored with an appropriate identifier (such as the Access Point ID, which is a unique identifier associated with the AP/femto-cell) of all APs with which it is registered.

This AP database 350 has a number of potential uses, including:

For controlling the access to any given AP when a closed system is implemented; and For the implementation of Vodafone's "Homezone"™ which differentiates between owners and members who receive preferential tariffs and, potentially, treatment, and guests, who have access to the network via the AP, but at the normal tariff (i.e. same as through the macro-network).

On receiving the instruction to page subscriber C, the RNC concentrator(s) 340 queries the AP database 360 to retrieve the AP IDs of the APs which are within the LA and to which the subscriber being paged is registered, whether as an owner, member or guest at 460.

Figure 7:
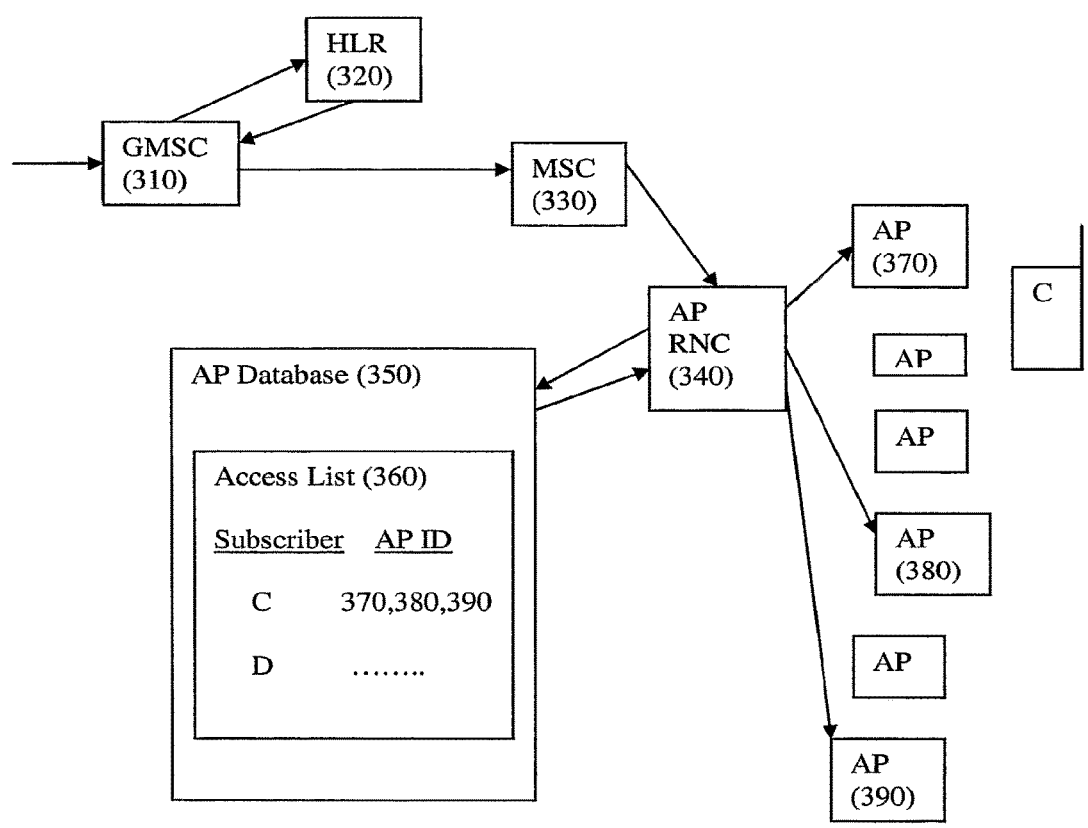
FIG. 7 shows the network architecture of a mobile communication network incorporating APs and the paging path to subscribers who are camped on those APs.

In the example of FIG. 7, subscriber C is registered to use three separate APs, namely 370, 380 and 390. Since these are the only three APs on which the target subscriber could be camped (since they are the only APs to which the subscriber is registered) these are the only APs which need to page the subscriber. At 470, the AP RNC 340 then instructs paging messages to be transmitted on the paging channels of all the femto-cells of the LA in which the target subscriber is registered, namely 370,380 and 390. These pages are transmitted from APs 370, 380 and 390 at 480.

In the situation where the LA includes a macro cell, the page will also be sent out on that macro cell, since, typically, macro cells are open.

At the time the page is transmitted, subscriber C is located in a cell provided by AP 370. On receiving the page from the network via AP 370, subscriber C reads the paging message and responds at 490, setting up a radio signalling channel and progressing with the call control. The call is then established and a radio channel is established at 500.

This embodiment of the invention therefore helps to reduce the paging load to APs through to the femto-layer and potentially eliminates restrictions on the allocation of femto cells to LAs.

According to an alternative embodiment, the network has a default position whereby it always pages the UE in one or more default "Home APs" as well as the Tracking Area where the UE was last registered. This embodiment of the invention is particular useful where the number of APs with which the UE can associate is small (i.e. one or two), or where a single AP is seen as the default home AP.

Alternatively, if there are a large of APs with which the UE is registered in a given area, then the MME can page the UE in its current Tracking Area and a subset of the applicable APs. This will again help to minimise the paging load.

In the embodiments described above, the AP is configured to appear to the UE as a conventional base station that communicates with the UE using GSM/UMTS/LTE protocols in accordance with the Standards (where they exist) and the licensed radio spectrum. Alternatively, the AP could communicate with the UE by any other suitable technology—for example, by a Bluetooth® connection, WiFi or another unlicensed mobile access (UMA) protocol, which allows the GSM/UMTS/LTE features to be provided using a non-GSM/UMTS/L TE bearer technology.

The above described embodiments have also assumed that all APs in the network require access to them to be controlled, however it is also within the scope of this invention that only a subset of all the APs are controlled. For example, it is within the scope the present invention that some APs are given Tracking Area IDs, whereas others in the network are not.

What is claimed is:

1. In a telecommunications network including a radio access network comprising a plurality of base stations configured to wirelessly transmit data that is receivable by one or more mobile terminals, wherein at least one of the base stations comprises an Access Point (AP), a method of managing mobile terminal handover or reselection to the AP, the method including:

transmitting information from the AP usable by a mobile terminal included among the one or more mobile terminals to determine if the mobile terminal is allowed to access the AP, wherein the information includes a separate access indicator field, and wherein the separate access indicator field is usable to distinguish the AP from other types of base stations which include an eNode B;

generating a tracking area (TA) mapping that maps associations between the AP and a last known TA of the mobile terminal, the TA mapping being configured to permit the mobile terminal to move between the AP and the last known TA without requiring a TA update to occur when the mobile terminal moves between the AP and the last known TA; and providing the TA mapping to the mobile terminal.

2. The method of claim 1, wherein a mobile terminal that is included in the one or more mobile terminals has a list including any Access Points that the mobile terminal is authorized to use, and the method further includes the mobile terminal comparing identification information transmitted by the Access Point with the list to determine if the mobile terminal is authorized to utilize the Access Point.

3. The method of claim 2 further including the mobile terminal receiving the list from a core network node.

4. The method of claim 2 further including the mobile terminal using the list to know which allowable cells to monitor for signal strength and/or interference parameters.

5. The method of claim 2 further including the mobile terminal keeping a measurement report on any Access Points in the list that it is allowed to access.

6. The method of claim 1, wherein, unless it is determined that the Access Point is an allowable cell, each of the one or more mobile terminals does not attempt to reselect to the Access Point.

7. The method of claim 1, wherein, unless it is determined that the Access Point is an allowable cell, each of the one or more mobile terminals does not keep a measurement report on the Access Point, for the purposes of handover decisions.

8. The method of claim 1 wherein the information transmitted by the Access Point is usable by each of the one or more mobile terminals to determine if it is authorized to reselect to the Access Point without the need for each mobile terminal to determine the same from the core network via signaling.

9. The method of claim 1 wherein the at least one of the base stations comprising an Access Point are closed except to certain subscribers.

10. A mobile terminal configured for use in a telecommunications network including a radio access network comprising a plurality of base stations, each defining a cell, and being configured to wirelessly transmit data that is receivable by the mobile terminal, with at least one of the base stations comprising an Access Point (AP), and wherein the mobile terminal is further configured to:

receive a tracking area (TA) mapping that maps associations between the AP and a last known TA of the mobile terminal, the TA mapping being configured to permit the mobile terminal to move between the AP and the last known TA without requiring a TA update to occur when the mobile terminal moves between the AP and the last known TA;

receive data transmitted by the Access Point, wherein the data includes a separate access indicator field, and wherein the separate access indicator field is usable to distinguish the Access Point from other types of base stations which include an eNode B;

determine from the received data if the mobile terminal is entitled to utilize the Access Point; and initiate a request to utilize the Access Point only if the mobile terminal is entitled to do so.

11. The mobile terminal of claim 10 where the mobile terminal has a list including any Access Points that the mobile terminal is authorized to use, and the mobile terminal is further configured to compare identification information transmitted by the Access Point with the list to determine if the mobile terminal is authorized to utilize the Access Point.

12. The mobile terminal of claim 11 further configured to use the list to know which allowable cells to monitor for signal strength and/or interference parameters.

13. The mobile terminal of claim 11 further configured to keep a measurement report on any Access Points in the list that it is allowed to access and excluding any Access Points that is not authorized to access.

14. The mobile terminal of claim 10 wherein the mobile terminal is further configured to initiate a handover or reselection to the Access Point if the mobile terminal determines it is entitled to use the Access Point.

15. The mobile terminal of claim 14, wherein the mobile terminal is configured to not attempt to handover or reselect to the Access Point unless it is determined that the Access Point is an allowable cell.

16. A non-transitory computer readable medium comprising instructions that, when executed by a processor, cause a mobile terminal to perform a method, the mobile terminal configured for use in a telecommunications network including a radio access network comprising a plurality of base stations, each defining a cell, and being configured to wirelessly transmit data that is receivable by the mobile terminal, with at least one of the base stations comprising an Access Point (AP), the method comprising:

receiving a tracking area (TA) mapping that maps associations between the AP and a last known TA of the mobile terminal, the TA mapping being configured to permit the mobile terminal to move between the AP and the last known TA without requiring a TA update to occur when the mobile terminal moves between the AP and the last known TA;

receiving data transmitted by the Access Point, wherein the data includes a separate access indicator field, and wherein the separate access indicator field is usable to distinguish the Access Point from other types of bases stations which include an eNode B;

determining from the received data if the mobile terminal is entitled to utilize the Access Point; and initiating a request to utilize the Access Point only if the mobile terminal is entitled to do so.

17. A mobile terminal configured for use in a telecommunications network including a radio access network comprising a plurality of base stations, each defining a cell, and being configured to wirelessly transmit data that is receivable by the mobile terminal, with at least one of the base stations comprises an Access Point (AP), and wherein the mobile terminal is further configured to:

receive a tracking area (TA) mapping that maps associations between the AP and a last known TA of the mobile terminal, the TA mapping being configured to permit the mobile terminal to move between the AP and the last known TA without requiring a TA update to occur when the mobile terminal moves between the AP and the last known TA;

receive data transmitted by the Access Point;

determine that the received data includes an Access Indicator Field, the Access Indicator Field being data that is transmitted by the Access Point to restrict access, wherein the Access Indicator Field is usable to distinguish the Access Point from other types of base stations which include an eNode B; and using the Access Indicator field to determine if the mobile terminal is entitled to utilize the Access Point, and only attempting to utilize the Access Point if the mobile terminal is entitled to do so.

18. In a telecommunications network including a radio access network comprising a plurality of base stations configured to wirelessly transmit data that is receivable by one or more mobile terminals, wherein at least one of the base stations comprises an Access Point (AP), a method of restricting access to the at least one Access Point, the method including:

generating a tracking area (TA) mapping that maps associations between the AP and a last known TA of the mobile terminal, the TA mapping being configured to permit the mobile terminal to move between the AP and the last known TA without requiring a TA update to occur when the mobile terminal moves between the AP and the last known TA; and transmitting information from each Access Point from which mobile terminals are able to determine their ability to access the given base station, wherein the information includes a separate access indicator field, and wherein the separate access indicator field is usable to distinguish the each Access Point from other types of bases stations which include an eNode B.

19. The method of claim 18 wherein the information transmitted is an Access Indicator Field.

20. The method of claim 18, wherein unless it is determined that the mobile terminal has a right of access to the base station, the mobile terminal does not attempt to access the base station.

* * * * *